United States Patent [19]

Jacques et al.

[11] Patent Number: 5,437,703
[45] Date of Patent: Aug. 1, 1995

[54] BENDING GLASS SHEETS

[75] Inventors: Neil W. Jacques, Burscough; Brian J. Thomas; David Sykes, both of Wigan; James Boardman, Birmingham, all of United Kingdom

[73] Assignee: Pilkington Glass Limited, United Kingdom

[21] Appl. No.: 202,367
[22] Filed: Feb. 25, 1994

[30] Foreign Application Priority Data

Mar. 3, 1993 [GB] United Kingdom ............... 9304286

[51] Int. Cl.6 ...................... C03B 23/023; C03B 23/03
[52] U.S. Cl. .......................... 65/106; 65/273; 65/290; 65/291
[58] Field of Search ............... 65/106, 273, 290, 291, 65/289

[56] References Cited

U.S. PATENT DOCUMENTS

| 4,229,200 | 10/1980 | Seymour | 65/106 |
| 4,501,603 | 2/1985 | Frank et al. | 65/106 |
| 4,514,208 | 4/1985 | Nitschke | 65/273 |
| 4,720,296 | 1/1988 | Bartusel et al. | 65/106 |
| 4,865,638 | 9/1989 | Kudo | 65/273 |
| 4,892,574 | 1/1990 | Cortes . | |
| 5,049,178 | 9/1991 | Pereman et al. . | |
| 5,302,176 | 4/1994 | Shibuya et al. | 65/106 |

FOREIGN PATENT DOCUMENTS

| 0139524 | 5/1985 | European Pat. Off. . |
| 0211755 | 2/1987 | European Pat. Off. . |
| 0298426 | 1/1989 | European Pat. Off. . |
| 0338216 | 10/1989 | European Pat. Off. . |
| 0351739 | 1/1990 | European Pat. Off. . |
| 2162170 | 1/1986 | United Kingdom . |
| 2166133 | 4/1986 | United Kingdom . |
| 2185974 | 8/1987 | United Kingdom . |
| WO85/03068 | 7/1985 | WIPO . |
| WO93/14038 | 7/1993 | WIPO . |

Primary Examiner—W. Gary Jones
Assistant Examiner—Steven P. Griffin
Attorney, Agent, or Firm—Howrey & Simon

[57] ABSTRACT

A method is provided in which a glass sheet is bent on a mould having a movable end, comprising the steps of: heating the glass sheet to its bending temperature; subjecting the glass sheet to an initial gravity bending step; providing support to a portion of the glass sheet located on the movable end of the mould; while providing said support, lowering said movable end away from the glass sheet; subjecting the glass sheet to a press bending step; cooling the bent glass sheet. Support may be provided by a reduced pressure within an upper mould, a mechanical arm, or gas directed in a generally upwards direction. The invention may be used for bending glass for architectural or automotive purposes, e.g. for bending a pair of glass sheets, one on top of the other, for use in the manufacture of a laminated windscreen, to achieve deep and/or complex bent shapes.

17 Claims, 11 Drawing Sheets

BENDING GLASS SHEETS

BACKGROUND OF THE INVENTION

1. Field of the Invention

This invention relates to the bending of glass sheets, and more particularly to a method of bending glass sheets in which there is an initial gravity bending step and a subsequent press bending step. Such a method is especially, but not solely, useful for bending automotive glass for subsequent laminating. The invention also relates to an apparatus for use in the method.

2. Summary of Related Art

Glass for the windows of vehicles is normally curved, the curvature being imparted to planar glass by a bending process. In one such bending process, planar glass sheets are placed upon female ring moulds and heated to the glass softening point. Each sheet bends ("sags") under its own weight until the periphery of the glass sheet is in contact with the ping mould. Such a bending technique is known as "sag" or gravity bending, and it has been developed over the years so as to bend glass which meets the demands of vehicle manufacturers.

For example, as mope deeply bent glass was required, the ring mould was modified by attaching the ends of the mould to the central portion by hinges, the hinged mould ends progressively closing as the glass softened and the bend proceeded. This avoided the tendency for the glass sheet to slide relative to the mould during the bend, thereby preventing scratching. Such a mould is commonly termed an articulated mould.

The gravity bending process has been found particularly suitable for the production of glass that is to be subsequently laminated by combining two sheets of glass with a sheet of interlayer material. The gravity bending process is capable of producing glass to a high optical quality, and it is also possible to bend two sheets of glass simultaneously, thereby producing a matched pair of glasses which give an excellent fit on laminating.

In recent years, developments in vehicle design have required glass of complex curvature, i.e. glass that is bent in two directions generally at right angles to each other. It is not possible to impart more than a very limited degree of complex curvature to a sheet of glass by gravity bending alone.

Furthermore, increased use of automated assembly by vehicle manufacturers demands that tighter dimensional tolerances be met by the glass. The shape of the periphery of the bent pane must be accurate, not only in terms of its two dimensional projection, but also in three dimensions, i.e. the angle of the glass adjacent the periphery must be correct. If this "angle of entry", as it is known to those skilled in the art, is not correct, the bent pane will not fit and seal satisfactorily in the receiving flange of the vehicle bodywork.

Moreover, the optical properties of the window depend on the shape of the central region of the glass which must therefore be accurately controlled in order that the required optical standards may be met.

These requirements, in conjunction with the trend to deeper, and more complex bends, can no longer be met by glass bent by the gravity bending technique alone. It is now regarded as necessary to complete the bending of such shapes by a subsequent press bending step. This step may only involve a limited part of the area of the bent pane, for instance the areas that, after installation in a vehicle body, will be adjacent the windscreen pillars of said body. In many current vehicle designs, such areas of the pane are required to be more deeply bent, and in this specification, any area of a pane which is required to be more deeply bent by means of a subsequent press bending step will be referred to as a deep bend portion.

An example of such a subsequent press bending step is given in European Patent Application number 89103298.9 in the name of Asahi Glass Company Ltd., and published as EP 338 216. This discloses an arrangement in which a pair of auxiliary male moulds press the deep bend portions of a pane against a ring mould. Either the hinged ends of an articulated mould on which the gravity bending has taken place are securely locked in position during the press bending step, or the glass is transferred to a non-articulated, i.e. Fixed, mould between the gravity bending step and the subsequent press-bending step. Such transfer is undesirable because the glass may lose shape, or temperature, or both in the course of the transfer. Furthermore, whether the press bending step is carried out on the articulated mould with the hinged ends locked in position, or after transfer to a fixed mould, it is necessary to extend the ends of the mould by 'wide lands' to provide an adequate, correctly angled, alternative support for the deep bend portions, thereby reducing marking of the glass and attaining the required angle of entry during the press bending step. The term 'wide land' is used to denote a ribbon-like strip of metal which is attached to the hinged end of the ring mould at an appropriate angle. It supports the glass sheet in place of the narrow upper edge of the ring mould end. However, use of such wide lands affects heat flow from the glass sheet, causing excessively high edge stress, and necessitating the taking of special measures to anneal the glass.

A disadvantage of this system as a whole is that every mould used for the pressing step needs to be reinforced to withstand the pressing force, equipped with wide lands, and if articulated, mould end locking devices. In a production furnace there may be in excess of 20 of these moulds, thereby resulting in a larger amount of fabrication work and expense in preparing a complete set of moulds.

For such reasons it is preferable not to use part of the ring mould, such as a hinged end, or an additional fixed ring mould, for supporting a deep bend portion of a sheet during the subsequent press bending step.

SUMMARY OF THE INVENTION

It has now been discovered that a satisfactory subsequent press bending step can be achieved by using means other than part of a conventional articulated gravity bending ring mould (or a fixed mould after transfer) to support the deep bend portion of a sheet, provided steps are taken to prevent unwanted sagging of the glass while said part is brought out of contact with the glass, and said other means is brought into contact with the glass.

According to the present invention there is provided a method of bending a glass sheet on a mould having at least one movable end, comprising the steps of:
 subjecting the glass sheet to an initial gravity bending step on the mould,
 providing support to a portion of the glass sheet located on the movable end of the mould,
 while providing said support, lowering said movable end of the mould away from the glass sheet,
 subjecting the glass sheet to a press bending step.

The movable end of the mould may be hinged as described above, but any mechanical arrangement allowing the end to be lowered, relative to the central portion, and away from the glass would be sufficient.

The invention is carried out on a bending system which includes a furnace, in which the glass sheet is heated to its bending temperature. The method in accordance with the invention may be carried out in a part of the bending system which is directly heated by its own heating means (whether being a part of the furnace or not), or in a part which is heated principally by the passage of the hot glass therethrough (and any heating of the moulds which may be carried out); or the method may be carried out partly in a directly heated part and partly in a part heated principally by passage of the hot glass.

After bending the sheet will generally be cooled, for example, by an annealing process, although it may be tempered (or heat strengthened) if preferred.

There are many ways of providing the required support to said portion of the glass sheet located on the movable end of the mould.

According to one aspect of the invention, the support may be provided by means of a reduced pressure within an upper mould. Preferably, the reduced pressure is applied only to the portion or portions of the glass sheet to be supported, or possibly only to parts of said portion or portions.

According to another aspect of the invention, the support may be provided by means of at least one mechanical arm having an end adapted to contact the glass. Because of the need to allow the arm to move in and out of contact with the glass without obstructing or being obstructed by other parts of the bending system such as the movable end of the mould, the arm preferably contacts only part, for example the margin of the portion or portions of the glass sheet to be supported.

According to a further aspect of the invention, the support may be provided by means of gas, for example air, directed in a generally upwards direction. Preferably, the gas is applied only to the portion or portions of the glass sheet to be supported, or possibly only to parts of said portion or portions.

According to the present invention there is also provided an apparatus for bending a glass sheet comprising:
a lower mould having at least one movable end,
means for opening and closing said movable end,
at least one upper mould mounted above the lower mould,
means for reciprocating the upper mould relative to the lower mould,
at least one pressing wing movably mounted so as to make pressing contact with a portion of the glass sheet to be deeply bent,
means for providing support to a portion of the glass sheet located on the movable end of the lower mould.

In conventional automotive glass bending practice, the upper mould is a male or convex mould, and the lower mould is a female or concave ring mould. The pressing wing used in the apparatus of the present invention would similarly also usually be of female or concave curvature. However, the present invention is also applicable to other arrangements of moulds.

A deep bend portion produced by the present invention may be required in panes for glazing side windows of vehicles. However, the invention is especially useful for bending, one on top of the other, a pair of glass sheets to be laminated into a windscreen, which has two such deep bend portions as a result of its symmetry. It will be clear that in such an application, the lower mould has two movable ends, there are two pressing wings, and support is provided to the two portions of the glass sheet, previously supported on the movable ends.

An upper mould employed in the invention may comprise one or more pads, each located at a deep bend portion of the glass sheet, so as to contact said portion during the press bending step, or the upper mould may be a full face mould, i.e. one that covers substantially the whole glass sheet, or indeed it may be an oversize full face mould. Furthermore, by use of an appropriate full face upper mould in conjunction with an appropriate lower mould, it is possible to produce an S-shaped curvature in the direction running from the upper edge of the glass pane (as seen when installed) to the lower edge, in conjunction with a C-shaped curvature (with deep bend portions adjacent the pillars) in the side to side direction.

Whereas the description that follows contemplates the glass sheet remaining on a part of the lower mould on which it has been sag bent throughout the bending operation, it should be understood that the invention also includes a method of bending a glass sheet in which the sheet is removed from the lower mould for the press bending step, and support is also provided for the part of the sheet that was on said part of the lower mould.

BRIEF DESCRIPTION OF THE DRAWINGS

The invention is illustrated but not limited by the following description with reference to the accompanying drawings in which.

DETAILED DESCRIPTION OF THE PREFERRED EMBODIMENTS

Figure 1:
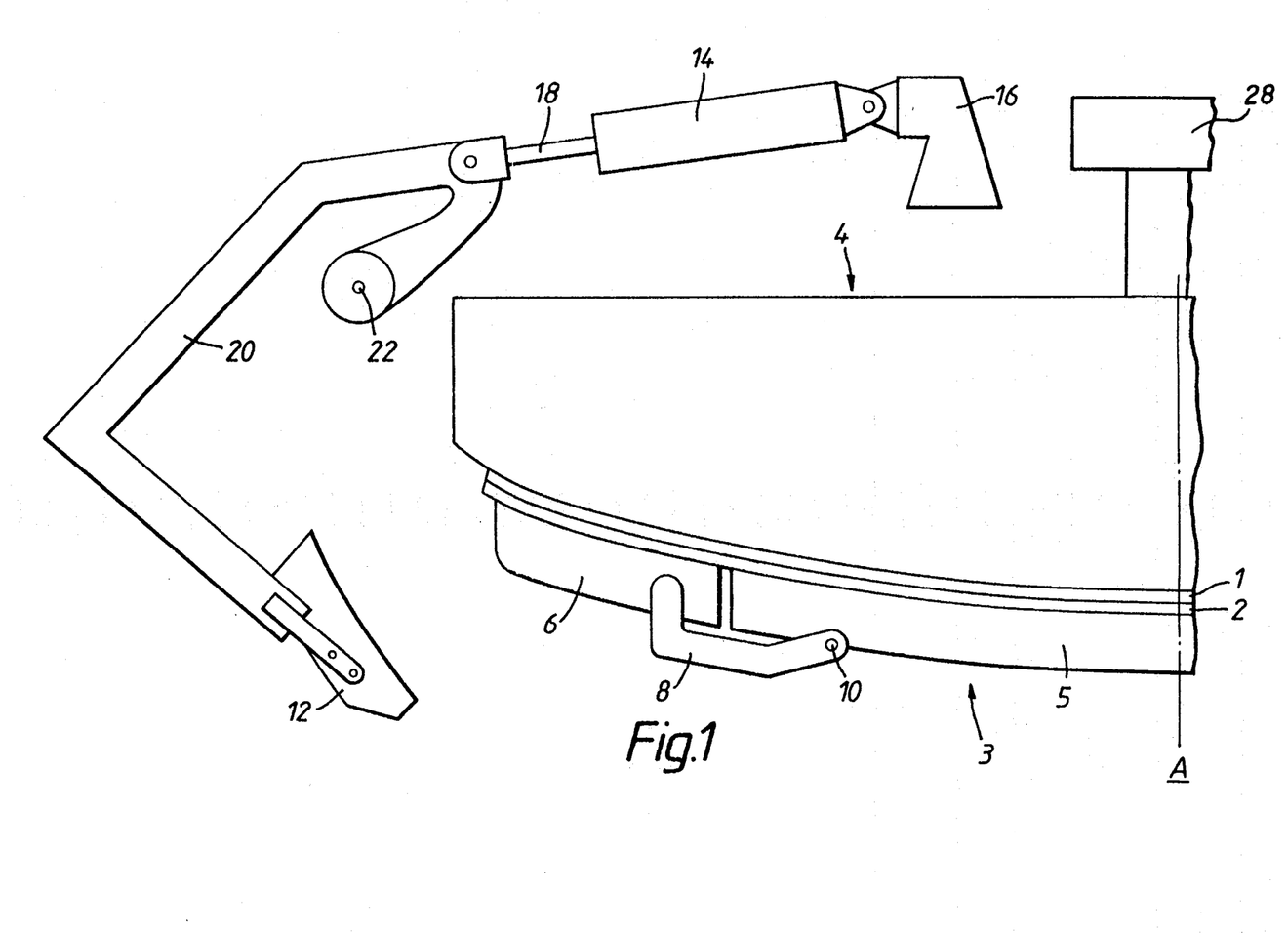
FIG. 1 is a schematic side view of part of a bending system showing parts of an upper mould, lower mould, bent glass sheets and a pressing wing in their respective positions before the start of the press bending step. Means of providing support, suitable for use in the system of FIG. 1, is shown in the following figures.

With reference to FIG. 1, there is illustrated the left-hand side (as viewed) of part of the bending system at the start of the press bending step. The right-hand side of the system has been omitted so as to enable the left-hand side to be shown more clearly, and it should be understood that the right-hand side is a mirror image of the left-hand side in imaginary mirror plane A—A.

A pair of bent glass sheets consisting of an upper sheet 1 and a lower sheet 2 are supported, one on top of the other, on a lower mould generally designated 3, which here is a female ring mould, and which is closed at this point in the cycle. Lower mould 3 comprises a central portion 5, a left-hand movable end 6 and a right-hand movable end (not shown on this figure).

Figure 19:
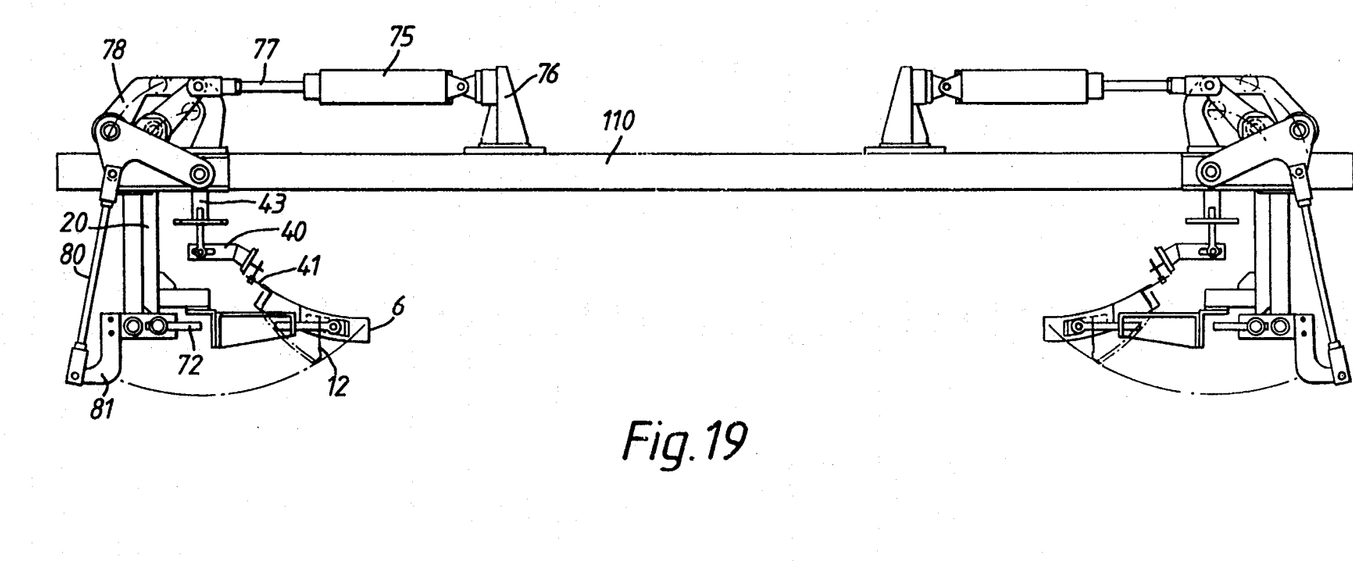
FIG. 19 is a side view of an assembly according to the second embodiment which includes parts of the subject matter of FIGS. 1, 4, 8 and 18 (all of which show a left-hand side only), mounted on a frame together with the corresponding right-hand side of the bending system.

The mould end 6, may, as mentioned before, be rendered movable by a variety of mechanical arrangements; it is shown here connected to the central mould portion 5 by means of a hinge comprising link 8 which pivots about an axis 10. Above the glass sheets 1,2 there is provided an upper mould generally designated 4 which is in vertical alignment with lower mould 3. Upper mould 4 is mounted on a mechanism 28 of conventional nature allowing the mould to reciprocate in a vertical direction (alternatively, the upper mould may be fixed and the lower mould mounted for reciprocation). Upper mould 4 may take different forms according to the embodiment of the invention which is being practised, as will hereinafter be more fully described. With the exception of the lower mould 3, all the elements of the bending system may be mounted on a frame 110 of conventional nature, which is shown in FIG. 19 only, and which has been omitted from the other drawings so as to better reveal the elements themselves.

Generally to the left of the lower mould 3 there is provided a pressing wing 12, which here is of female shape, and which is used in the press bending step of the invention. The pressing wing 12 is operated by a cylinder 14, which may be pneumatic or hydraulic, mounted on the frame (not shown in FIG. 1) via anchor 16. Actuation of the cylinder 14 causes piston rod 18 to protract, which in turn causes actuating arm 20 to rotate about axis 22, thereby moving pressing wing 12 and ultimately bringing it into its pressing position.

Lower mould 3 may be supported on a conventional means of transport such as a carriage, truck or conveyor, for passage through the various parts of the bending system.

Figure 2:
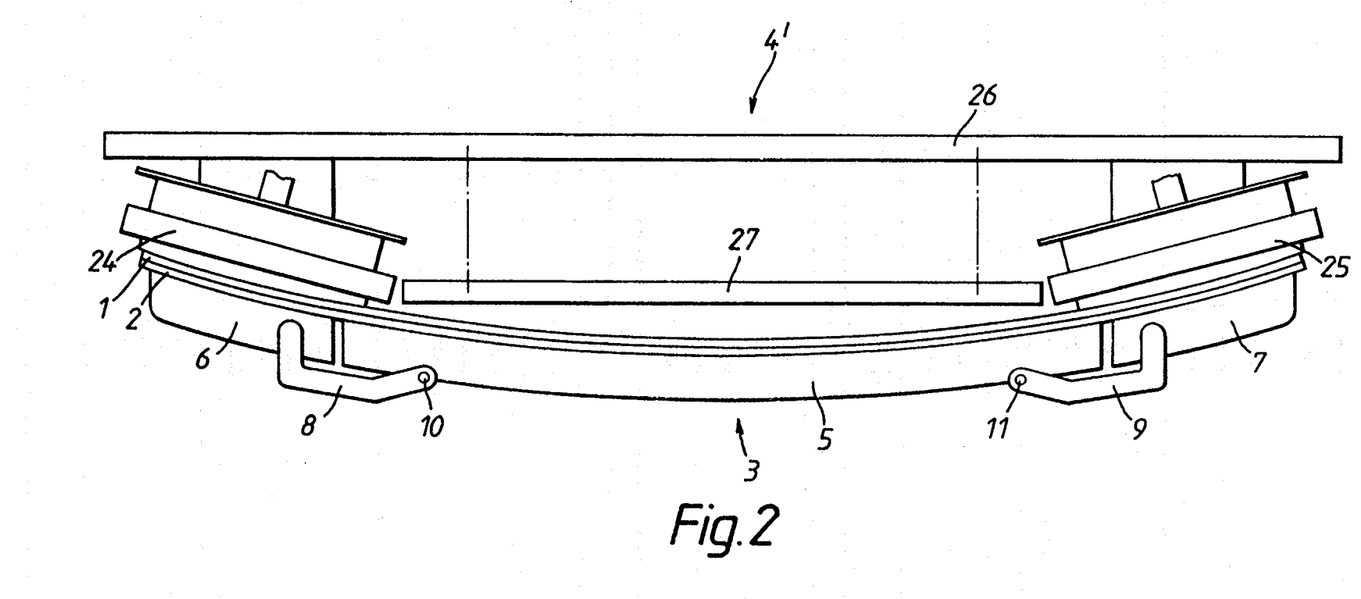
FIG. 2 is a schematic side view of an upper mould adapted in accordance with one embodiment of the invention to provide support to a portion of the sheets by means of a reduced pressure within parts of it.

No means of providing support to a portion of the glass sheets is illustrated in FIG. 1 because this may take a variety of forms according to the embodiment of the invention. In FIG. 2 there is illustrated a first embodiment of the invention in which such support is provided by means of a reduced pressure within parts of a modified upper mould 4'. The said parts consist of left and right-hand vacuum pads, 24 and 25, which are located above the deep bend portions of sheets 1,2, i.e. the portions to be supported. Pads 24,25 are attached to a frame member 26, which provides structural integrity to modified upper mould 4'. Also attached to frame member 26 is an insulating screen 27, which prevents excessive heat loss from the central region of the glass sheets 1,2. Also visible in FIG. 2 are right-hand movable mould end 7, right-hand link 9, and right-hand axis 11, which are mirror images of their left-hand counterparts described in conjunction with FIG. 1.

Figure 3:
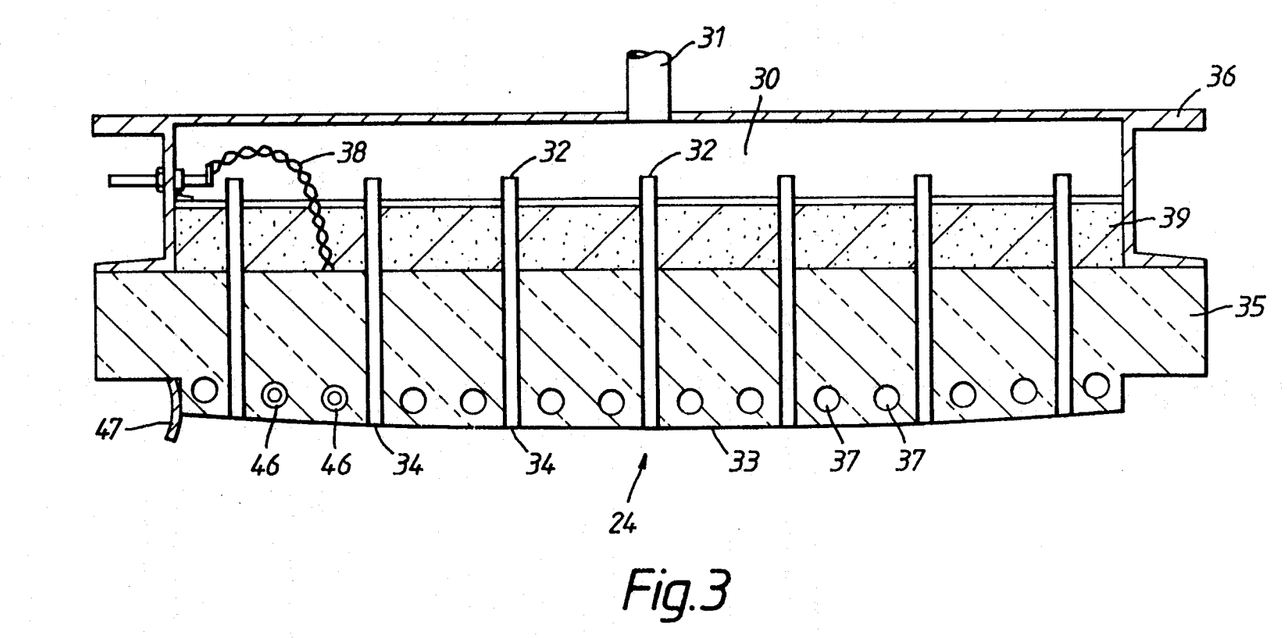
FIG. 3 is an enlargement, in cross section, of part of the mould shown in FIG. 2.

FIG. 3 is an enlargement of vacuum pad 24, showing its internal construction. Pad 25 corresponds, being a mirror image of pad 24. A vacuum pump (not shown) is connected to a vacuum chamber 30, that forms the upper part of the pad 24, via a pipe 31. The upper ends of a number of narrow tubes 32 open into the vacuum chamber 30, and the lower ends of the tubes 32 are formed by, or flush with, the glass contact face 33 of the pad 24. Face 33 therefore has a multitude of apertures 34 over its surface, representing the lower ends of tubes 32. There may be an increased concentration of apertures 34 in any region where the margins of the glass sheets require support, for instance in the parts of pad 24 nearest the periphery of the glass sheets 1,2.

In use there is a reduced pressure present at apertures 34, which supports the glass sheets 1, 2 so that sheet 1 is in contact with face 33, and sheet 2 is in contact with sheet 1. It is a surprising and unexpected effect of this embodiment of the invention that the deep bend portions of both glass sheets are adequately supported by vacuum pads 24 and 25 even though the reduced pressure within them apparently only acts directly on the upper sheet 1. By adequate support is meant support that maintains the then existing shape of the glass sheets 1,2 long enough for the movable mould ends 6,7 to descend, and the pressing wing 12 (and its right-hand counterpart) to swing in and perform the press bending step. Moreover, such support will again maintain the modified shape while the pressing wing 12 (and its right-hand counterpart) withdraw, and the movable ends 6,7 return to their original position.

Support is first required for portions of the glass sheets at a point in the bending cycle when the gravity bending step has been completed, but the press bending step has not yet been performed. At this point, the shape of the deep bend portions of the glass sheets 1,2 will not exactly correspond to that of the glass contact face 33 of vacuum pad 24 or 25. The larger the discrepancy, the less effectively the support is provided by the vacuum pads, because of the large gap left through which air may be sucked into apertures 34. In such cases, it is preferable to employ means for controlling air flow, e.g. baffle 47, attached to part of the upper mould 4', e.g. to the vacuum pads, and arranged to be adjacent the periphery of the glass sheets 1,2. Such baffles restrict the gap through which air may be sucked, causing an accelerated flow and resulting in a reduced pressure exerted in the gap between upper glass sheet 1 and glass contact face 33, thereby ensuring the effectiveness of the support. The baffle is preferably fabricated from sheet stainless steel and may extend around the end of the vacuum pad 24 in the manner of a skirt so as to partly enclose the deep bend portions of the glass sheets 1,2. Clearly, in pad 25 the baffle would be at the opposite end.

Each vacuum pad preferably comprises a ceramic part 35 surmounted by a steel casing 36 which houses, inter alia, the vacuum chamber 30. Narrow tubes 32 may consist of ceramic tubes or drillings within ceramic part 35 or a combination of both.

The vacuum pads 24,25 are preferably provided with internal heating means. Indeed, although such heating means are now disclosed while describing FIG. 3, it should be understood that such heating means are preferably also provided in the upper mould 4 used in conjunction with the second and third embodiments of the invention hereinafter described. Internal heating means are provided so that the glass contact face, 33 is maintained at a temperature approaching the glass bending temperature, which is a measure well known to those skilled in the art. A preferred internal heating means comprises conventional tubular spiral-wound electrical resistance heaters 46 located in channels 37, within ceramic part 35, close to glass contact face 33. Although such heaters 46 are shown by way of example in only two channels 37, they may be installed in all channels, or in as many as necessary to heat face 33. Electrical connection is made by suitably insulated cables 38 passing through casing 36. An alternative means of heating is the passage of a hot gas, e.g. air, through channels 37 from an external source of hot gas. To assist in the efficient maintenance of the mould temperature, the mould is provided with a layer 39 of thermal insulation of conventional nature between the ceramic part 35 and the casing 56.

In any embodiment of this invention, either the upper or the lower or both moulds may have their glass contact faces covered with a heat resistant cloth, e.g. a stainless steel cloth, as is common practice in the art.

Figure 4:
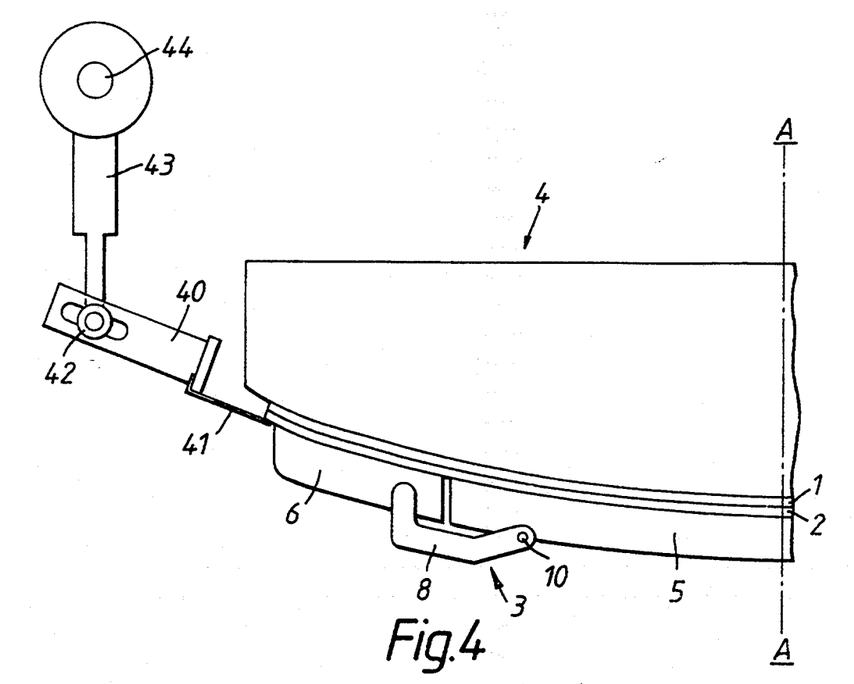
FIG. 4 is a schematic side view of a second embodiment of the invention showing, inter alia, a mechanical arm providing support to a portion of the glass sheets.

FIG. 4 illustrates a second embodiment of the invention in which the support to a portion of the glass sheets is provided by means of a mechanical arm 40 having an end 41 adapted to contact the glass. As in FIG. 1, only the left-hand side is shown, the right-hand side being a mirror image in imaginary mirror plane A—A. It is desirable for the end 41 to contact only the peripheral margin of the glass sheet 2, for example, the peripheral 6 mm. To facilitate this, lateral adjusting means 42 are provided in the arm 40, which is mounted at the end of a strut 43, itself pivotably mounted on an axis 44. The assembly may be pivoted between the position shown in the drawing, where the end 41 is in contact with glass sheet 2 and supporting both sheets 1,2, and a position in which end 41 is away from the glass sheets (as shown, for example, in FIGS. 10,11). Pivoting of the assembly is achieved by operation of a cylinder (not shown) of a similar type to cylinder 14 shown in FIG. 1.

Figure 5:
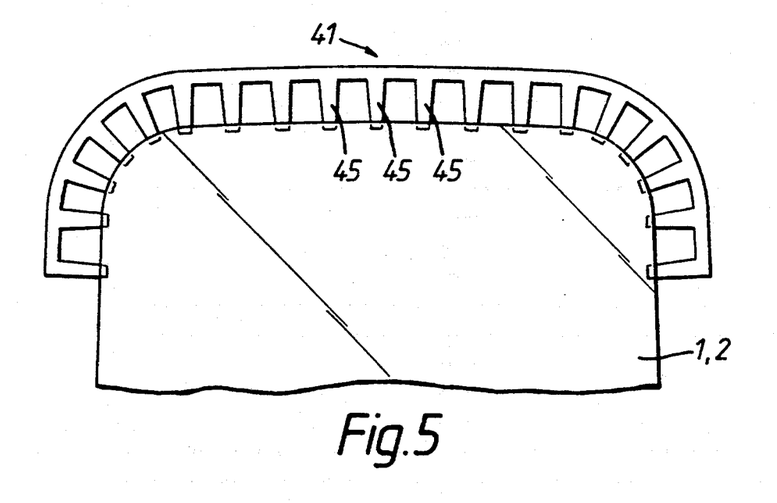
FIG. 5 is a schematic plan view of one version of the mechanical arm of FIG. 3, showing it supporting a margin of one or a pair of glass sheets.

End 41 may take a variety of forms. A preferred form is shown in FIG. 5, with the moulds 3,4, arm 40 and the remainder of the assembly omitted for clarity. This form of end 41 is manufactured from thin heat resistant metal, e.g. stainless steel, in sheet form, and consists of a number of tabs 45 arranged in crenellated manner along an arcuate profile corresponding to the periphery of the deep bend portion of the glass sheets. The advantage of the use of tabs is that rapid adjustment in the vertical direction of the shape of the end 41 may be achieved by bending of the tabs 45. In another form of the end 41 (not shown), this adjustment may be achieved by means of adjustment of nuts and bolts, the bolts being rotatably attached to a flexible glass contact member, and the nuts attached to a rigid frame member below.

Figure 8:
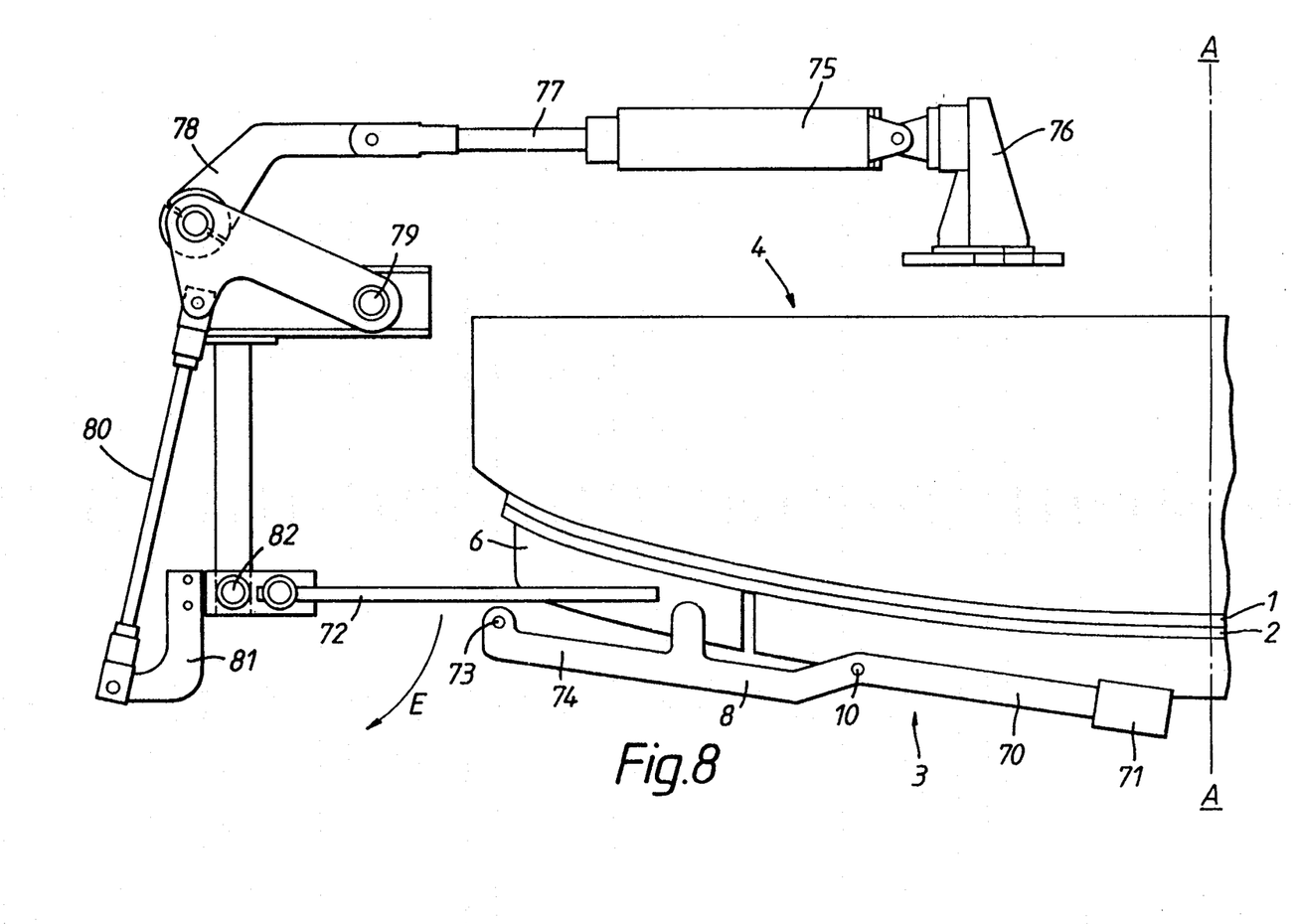
FIG. 8 is a side view of part of the bending system showing, inter alia, more detail of a mechanism for opening the movable ends of an articulated mould, which is common to all three embodiments mentioned above.
Figure 18:
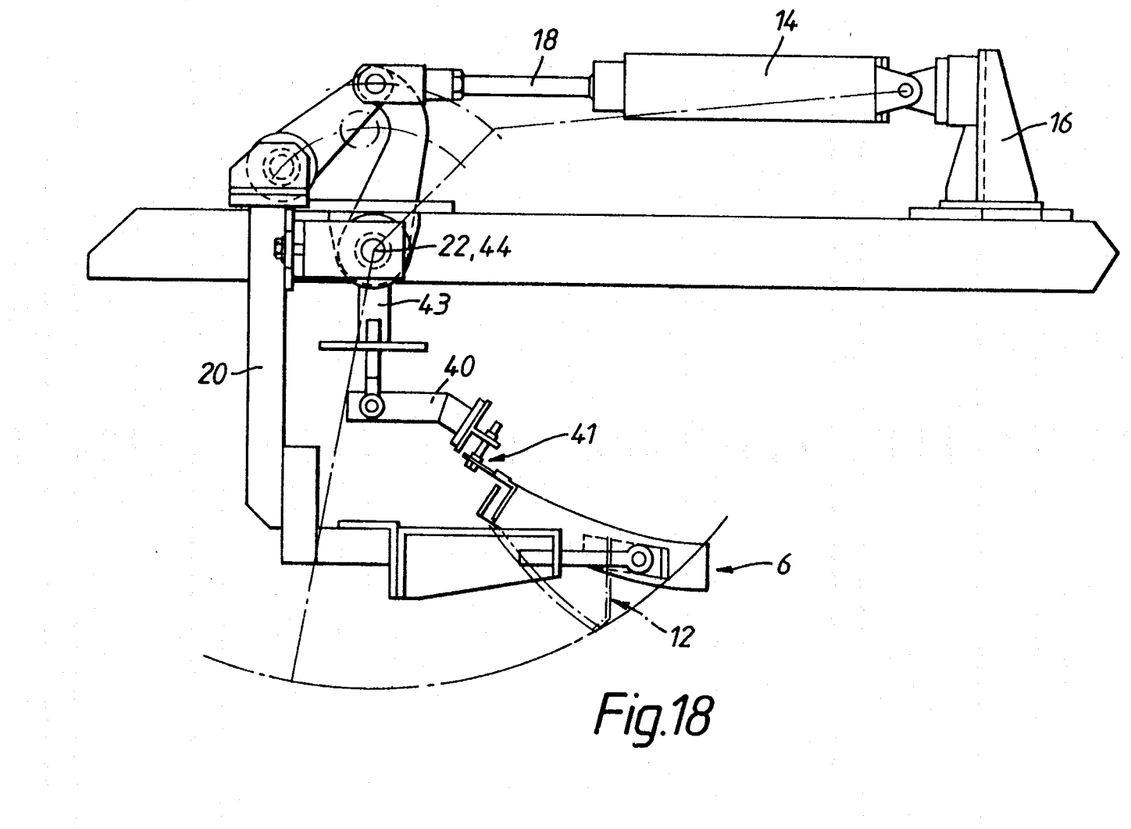
FIG. 18 is a side view of part of the bending system according to the second embodiment, which shows the pressing wing of FIG. 1, together with its operating mechanism, and the mechanical arm of FIG. 4.

In FIGS. 18 and 19, wherein like reference numerals denote like parts, more detail of the mechanical arm of FIG. 4, the pressing wing of FIG. 1, and, in FIG. 19, the mould opening mechanism of FIG. 8 is shown.

Figure 6:
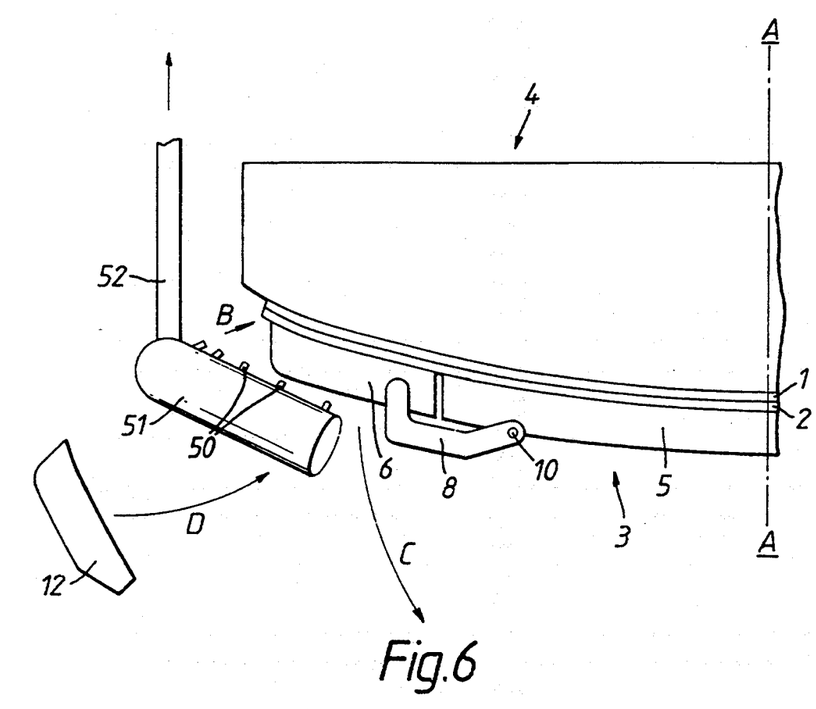
FIG. 6 is a schematic side view of a further embodiment of the invention, showing, inter alia, a means of directing gas in a generally upwards direction so as to provide support to a portion of the glass sheets.
Figure 7:
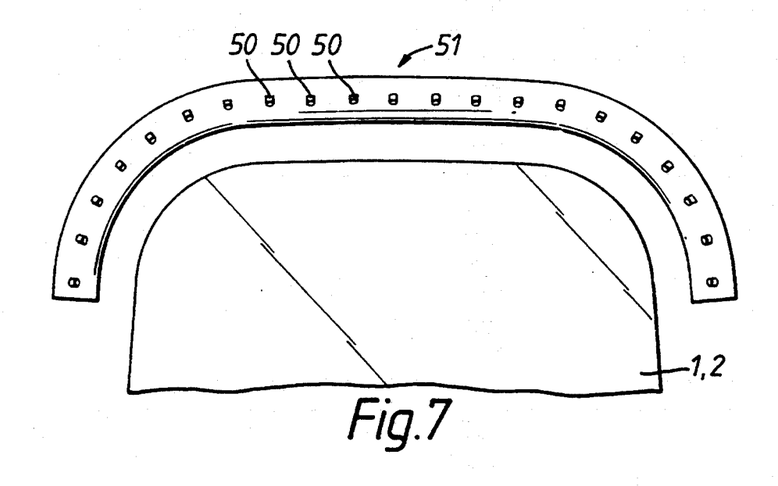
FIG. 7 shows the means of directing the gas, in an approximately plan view.

A third embodiment of the invention is illustrated in FIGS. 6 and 7, in which support to a portion of the glass sheets 1,2 is provided by means of gas, for example, air, directed in a generally upward direction. As in FIGS. 1 and 4, the left-hand side only is shown in FIG. 6 for clarity, and the right-hand side is a mirror image in imaginary mirror plane A—A. The gas directed at the glass may be at a temperature close to that of the glass in order to avoid the generation of undesirable stresses in the glass sheets 1,2. Gas may be directed at the margin of the glass in jets, for instance in the direction of arrow B, from a series of nozzles 50, which are mounted in a curved pipe 51 extending around the deep bend portion of the glass. Pipe 51 is attached to a strut 52 provided with means of movement in a vertical direction so that pipe 51 may be retracted from its operating position. The operating position is chosen so as to be as close as possible to the glass sheets 1,2 without pipe 51 causing an obstruction to either movable mould end 6 as it drops away from the glass in the direction of arrow C, or pressing wing 12 as it swings up in the direction of arrow D to perform the press bending step. This requires that the curvature of pipe 51 is of generally larger radius than the periphery of glass sheets 1,2, but otherwise similar, so that when viewed in plan, as in FIG. 7, pipe 51 is somewhat outwardly displaced from the periphery of glass sheets 1,2.

In FIG. 7 strut 52, moulds 3,4 and pressing wing 12 have been omitted for the sake of clarity. In preferred versions, pipe 51 has an internal diameter of 50–60 mm, a length of 1–2 meters, and nozzles 50 vary from 12 to 30 in number at spacings of 75 to 30 mm. The diameter of each individual nozzle is 6 mm. Air is used at pressures of 10 kPa to 30 kPa, measured at the inlet to pipe 51, and at temperatures of approximately 570° C. –670° C., measured at nozzles 50.

As previously mentioned, upper mould 4 employed in the second and third embodiments of this invention is preferably provided with internal heating means. Furthermore, upper mould 4 may comprise appropriately shaped pads located only at the deep bend portions of sheets 1,2, or it may be a full face mould to control curvature across the whole of sheets 1,2.

All embodiments of the invention require that the lower mould be opened, i.e. that at least one movable end be swung downwardly away from the glass to allow a pressing wing 12 to swing upwardly to contact the glass and perform the press bending step. One mechanism for opening the mould is shown in FIG. 8, although it is emphasised that mechanisms for opening articulated moulds are well known to those skilled in the art of automotive glass bending, and a different mechanism could be employed without departing from the spirit of the invention.

As in FIGS. 1, 4 and 6, the left-hand side only is shown in FIG. 8 for clarity, and the right-hand side is a mirror image in imaginary mirror plane A—A.

Two bent glass sheets 1,2 are shown in FIG. 8, in position on a lower mould 3 at the start of the press bending step. Movable mould end 6, hinge comprising link 8 and pivot axis 10 are as described in connection with FIG. 1, but for completeness, a counterweight arm 70, which forms an extension of link 8, together with its adjustable counterweight 71, are shown. Arm 70 and counterweight 71 act under the force of gravity to close the mould as the glass softens, and being of conventional nature have been omitted from other drawings for clarity. The mould is opened by actuating arm 72 moving in the direction of arrow E and bearing upon pin 73, which is mounted on a further extension 74 of link 8.

Movement of actuating arm 72 in direction E is achieved by operation of cylinder 75, which is attached to the frame via anchor 76. Piston rod 77 retracts into cylinder 75, thereby rotating upper crank 78 about axis 79, and causing connecting rod 80 to move in a generally upward direction. Rod 80 in turn rotates lower crank 81 about axis 82 in a clockwise sense as viewed in the thereby moving actuating arm 72 which is rigidly fixed to lower crank 81 (but with provision for adjustment).

Operation of the bending system will now be described in schematic form by following the progress of a complete bending cycle with reference to FIGS. 9 to 17. These illustrate the second embodiment of the invention as shown earlier in FIGS. 4 and 5, but the bending cycle is essentially the same for all embodiments as will become apparent.

Figure 9:
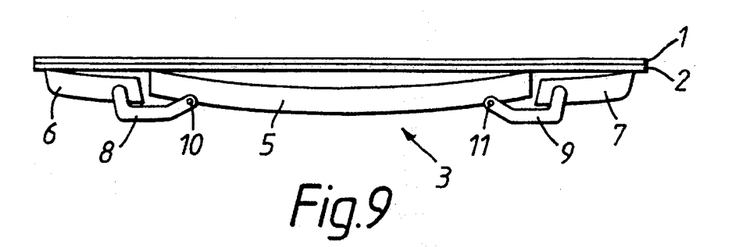
FIGS. 9 to 17 are schematic side views of the embodiment of FIGS. 4 and 5, showing the steps in a complete cycle of operation of the bending system.
Figure 10:
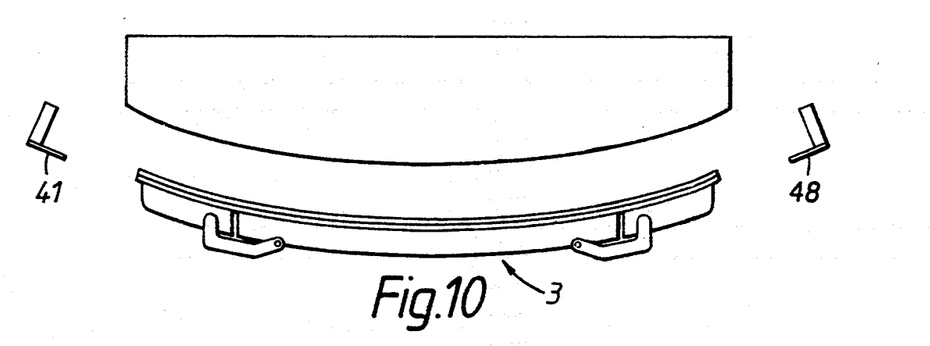

Planar glass sheets 1,2 are placed upon lower mould 3 which opens partly under their weight as a result, as is seen in FIG. 9. The mould 3 and glass sheets 1,2 are heated in a conventional manner, which may involve transport through a preheating section to a gravity bending station, until the glass softening temperature is reached and the glass sheets 1,2 begin to sag into conformity with the mould 3. As has already been described, this involves movement of the movable ends 6,7 to close the mould 3 as can be seen in FIG. 10. The gravity bending step is then complete, and is followed by the press bending step, which may involve transport of the mould 3 and sheets 1,2 to a different bending station. Alternatively, it would be possible to provide the pressing wings and associated mechanism, mould opening mechanism and means of glass support in the gravity bending station. In FIG. 10 the means of glass support shown comprises the end 41 of the mechanical arm described with reference to FIG. 3. End 48 is correspondingly a mirror image of end 41.

Figure 11:
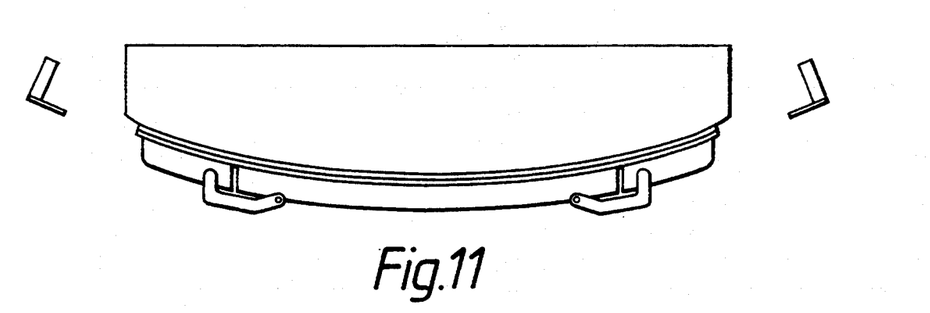
Figure 12:
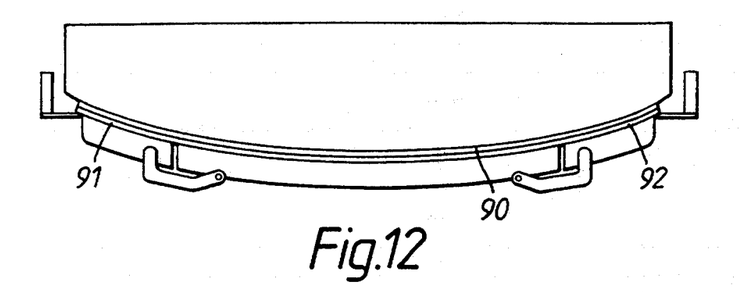
Figure 13:
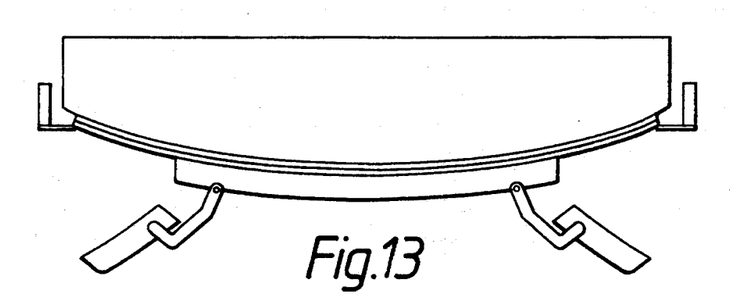

At the start of the press bending step the upper mould 4 descends until it is in contact with the upper glass sheet 1, as is shown in FIG. 11. Care must be taken that no pressure is exerted on the glass sheets 1,2 by upper mould 4, or marks will occur on either or both sheets. At this point the glass sheets 1,2 are not of exactly identical shape to the glass contact surface 90 (FIG. 12) of upper mould 4. In particular the deep bend portions 91,92 (FIG. 12) of sheets 1,2 will not be in exact conformity with surface 90 of upper mould 4 because of the limitations of the gravity bending step. This discrepancy in shape is not visible in the drawings which are of schematic nature.

Figure 14:
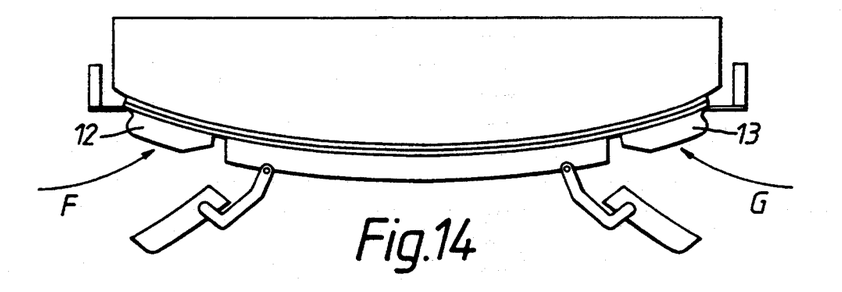

Alternative support is then provided to the deep bend portions of the glass sheets 1,2 in readiness for the descent of the movable mould ends 6,7. As illustrated in the embodiment of FIG. 11, this support is provided by ends 41,48, but could equally be provided by the reduced pressure within modified upper mould 4' or by jets of gas directed from pipe 51 and its right-hand partner in their operating positions. When the glass sheets 1,2 are thereby adequately supported, movable mould ends 6,7 descend away from said sheets as may be seen in FIG. 13. FIG. 14 shows both pressing wings, right-hand wing 13 being a mirror image of left-hand wing 12. Pressing wings 12,13 swing in the directions of arrows F and G respectively, so as to make contact with lower sheet 2, and then press the deep bend portions of both sheets 1,2 against glass contact surface 90 of upper mould 4. The shape of deep bend portions 91,92 is thereby brought into conformity with the shape of glass contact surface 90.

Figure 15:
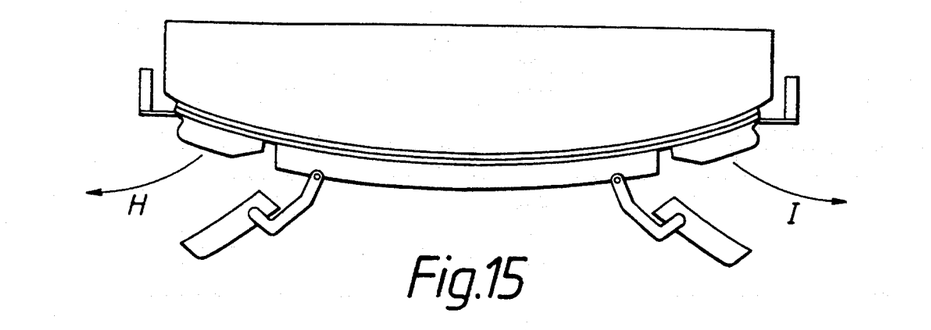
Figure 16:
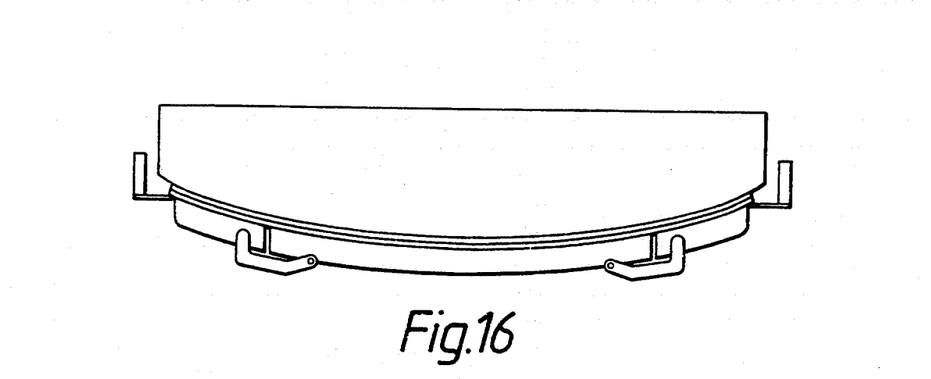
Figure 17:
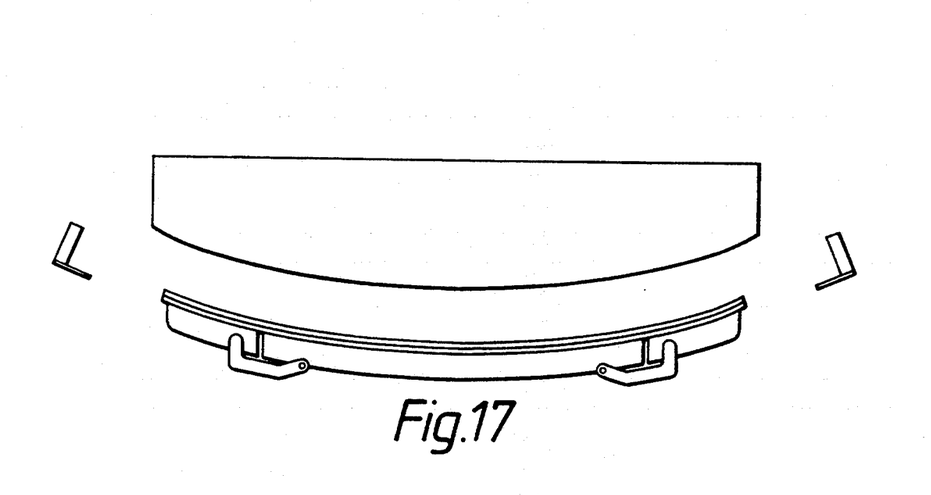

The remainder of the press bending step is in essence the reverse of the part described so far. Pressing wings 12,13 are retracted by swinging movements in the directions indicated by arrows H,I, as shown in FIG. 15. Support continues to be provided to portions of the glass sheets 1,2 by ends 41,48, or by reduced pressure within a modified upper mould 4', or by jets of gas upwardly directed from a pipe 51. The mould opening mechanism is then operated in reverse to allow the lower mould 3 to close gradually under the influence of the counterweights, and in FIG. 16 the lower mould 3 is shown closed, with support still provided by ends 41 and 48. The means of support is now removed i.e. ends 41,48 are withdrawn, or the pressure within a modified upper mould 4' is allowed to rise to normal atmospheric pressure, or the jets of gas from pipe 51 are turned off. Subsequently the upper mould 4 is raised as shown in FIG. 17 and the lower mould 3 together with bent glass sheets 1,2 may be transported to a cooling station.

While the invention has been described with reference to glasses bent in pairs, each having two symmetrically disposed deeply bent portions (for example for the production of laminated windscreens), it will be appreciated that it may equally be used for glasses bent singly, and for glasses (whether bent singly or in pairs) with a single deeply bent portion, for example vehicle side lights.

The invention herein described offers significant advantages over the prior art methods of bending glass described above. Deeply bent shapes are attainable while marking of the glass by the mould is reduced, and edge stresses may be reduced to a level where no special annealing measures are required. The cost of adding this invention to existing gravity bending production systems is reduced because one set of apparatus may be employed in a dedicated press-bending station, thereby avoiding the need to carry out expensive modifications to all the lower moulds in the system.

What is claimed is:

1. A method of bending a glass sheet on a mould having at least one movable end, comprising the steps of:
   heating the glass sheet to its bending temperature;
   subjecting the glass sheet to an initial gravity bending step on the mould, the gravity bending step beginning during the heating step;
   after the gravity bending step, providing alternative support to a portion of the glass sheet located at the movable end of the mould;
   while providing said alternative support, lowering said movable end of the mould away from the glass sheet;
   subjecting the glass sheet to a press bending step, while said portion of the glass sheet is supported by said alternative support; and
   cooling the bent glass sheet.

2. A method according to claim 1 wherein the mould has two movable ends, and the alternative support is provided to two portions of the glass sheet located at the two movable ends of the mould.

3. A method according to claim 1 wherein the alternative support is provided by means of a reduced pressure within an upper mould.

4. A method according to claim 1 wherein the alternative support is provided by means of at least one mechanical arm having an end which contacts said portion of the glass sheet.

5. A method according to claim 4 wherein said end which contacts said portion of the glass sheet comprises tabs arranged in crenellated manner along an arcuate profile corresponding to the periphery of said portion.

6. A method according to claim 1 wherein the alternative support is provided by means of gas directed in a generally upwards direction.

7. A method according to claim 6 wherein the gas is at a temperature of 570° C. to 670° C.

8. A method according to claim 1 wherein a pair of glass sheets is placed upon said mould, one on top of the other, before heating, so that the pair of glass sheets is bent together.

9. A method according to claim 1 wherein the press bending step is performed by a pressing wing pressing said portion of the glass sheet against an internally heated upper mould.

10. An apparatus for bending a glass sheet comprising:
a lower mould having at least one movable end for supporting at least a portion of the glass sheet,
means for lowering and raising said movable end,
means for providing alternative support to a portion of the glass sheet located on the movable end of the lower mould, so as to support said portion while said movable end is lowered,
an upper mould mounted above the lower mould,
means for reciprocating the upper mould relative to the lower mould,
at least one pressing wing movably mounted so as to make pressing contact with said portion of the glass sheet
and press said portion against the upper mould.

11. An apparatus according to claim 10, for bending a symmetrical glass sheet having two of said portions, wherein the lower mould has two of said movable ends and two of said pressing wings are provided, each pressing wing being mounted to press a respective one of said portions, and said means for providing alternative support is arranged to support each of said two portions of the glass sheet.

12. An apparatus according to claim 10 wherein the alternative support means comprises means for achieving a reduced pressure within the upper mould.

13. An apparatus according to claim 12 wherein the alternative support means additionally comprises means for controlling gas flow past the glass sheet into the upper mould.

14. An apparatus according to claim 10 wherein the alternative support means comprises at least one mechanical arm having an end for contact with said portion of the glass sheet.

15. An apparatus according to claim 14 wherein said end of said mechanical arm comprises tabs arranged in crenellated manner along an arcuate profile corresponding to the periphery of said portion of the glass sheet.

16. An apparatus according to claim 10 wherein the alternative support means comprises means for directing gas in a generally upwards direction.

17. An apparatus according to claim 10 wherein the upper mould is provided with internal heating means.

* * * * *